United States Patent [19]

Saneto et al.

[11] Patent Number: 4,865,102

[45] Date of Patent: Sep. 12, 1989

[54] RADIAL TIRE

[75] Inventors: Kazuyoshi Saneto, Hadano; Hisamiti: Masaki, Hiratsuka, both of Japan

[73] Assignee: The Yokohama Rubber Co., Ltd., Tokyo, Japan

[21] Appl. No.: 101,601

[22] Filed: Sep. 28, 1987

[30] Foreign Application Priority Data

Oct. 22, 1986 [JP] Japan ................................ 61-249584

[51] Int. Cl.⁴ ............................................. B60C 09/22
[52] U.S. Cl. ................................... 152/531; 152/536; 152/538
[58] Field of Search ............... 152/526, 535, 531, 533, 152/536, 538

[56] References Cited

U.S. PATENT DOCUMENTS 4,135,565  1/1979  van der Burg ................. 152/531 X
4,498,514  2/1985  Maathuis et al. ............... 152/536 X
4,745,956  5/1988  Yagi et al. ....................... 152/531 X

FOREIGN PATENT DOCUMENTS 57-26003  2/1982  Japan .................................. 152/536

Primary Examiner—Raymond Hoch
Attorney, Agent, or Firm—Nikaido, Marmelstein, Kubovcik & Murray Armstrong

[57] ABSTRACT

A radial tire comprising a pair of belt layer provided on a tread portion, a narrow reinforcing covers covering each of the edge portions of the belt layer, and a wide reinforcing cover provided on the narrow reinforcing covers so as to cover the full width of the belt layer, wherein the wide reinforcing cover has a multi-layer structure formed by winding a sheet in the circumferential direction of the tire so as to cause each successive layer to be put on top of a preceding layer.

1 Claim, 2 Drawing Sheets ized by increasing the denier number (thickness) of the cord constituting the reinforcing cover. However, mere increase in the denier number causes an increase in the difference in level at the cut portion because of an inevitable increase in the thickness of the reinforcing cover. This further enlarges the rigidity difference between the splice portions and the other portions, thus leading to lowering in the uniformity of the tire. Moreover, this tends to bring about damage to the uneven portions during high speed travelling.

RADIAL TIRE

BACKGROUND OF THE INVENTION

This invention relates to a pneumatic radial tire. More particularly, the present invention is concerned with a radial tire for high speed travelling which is excellent in high speed durability.

Conventional radial tires for high speed travelling include one in which a belt layer comprised of a steel cord is provided on the tread portion and is covered in both edge portions or in the entirety thereof with a reinforcing cover made of a nylon cord or the like. The reinforcing cover suppresses the lift of the belt layer caused by the action of centrifugal force during high speed travelling, thereby preventing edge separation of the belt layer, which contributes to an improvement in high speed durability.

In recent years, in order to further enhance the effect of improving high speed durability attained by the provision of the above-mentioned reinforcing cover, a radial tire as shown in FIGS. 3 and 4 was proposed. Such a radial tire is characterized in that each of the both edge portions of the steel belt layer 2 is covered with a narrow reinforcing cover 3 and, at the same time, the whole of the belt layer is covered with a wide reinforcing cover 4. However, in this radial tire, the reinforcing covers 3 and 4 inevitably have splice portions 3s and 4s. The rigidity of the splice portions is higher than that of the other portions, which brings about a rigidity difference in the circumferential direction of the tire in the tread portion. Therefore, when a number of reinforcing covers are used as shown in FIGS. 3 and 4, there also arises a difference in the degree of rigidity difference in the circumferential direction of a tire between the shoulder portion and the central portion. More precisely the rigidity difference in the central portion is larger than that in the shoulder portion.

The occurrence of the rigidity difference in the circumferential direction of a tire in the tread portion lowers uniformity of the tire, which causes occurrence of vibration during high speed travelling. This not only spoils riding comfort but also frequently causes damages to the splice portions.

The reinforcing cover is provided to suppress the lift of the belt layer made of a steel cord caused by the action of centrifugal force. Therefore, in order to enhance the effect, it is necessary for the reinforcing cover to have a given rigidity. In general, the rigidity of the reinforcing cover can be enhanced by increasing the denier number (thickness) of the cord constituting the reinforcing cover. However, mere increase in the denier number causes an increase in the difference in level at the cut portion because of an inevitable increase in the thickness of the reinforcing cover. This further enlarges the rigidity difference between the splice portions and the other portions, thus leading to lowering in the uniformity of the tire. Moreover, this tends to bring about damage to the uneven portions during high speed travelling.

SUMMARY OF THE INVENTION

An object of the present invention is to provide a radial tire for high speed travelling having excellent high speed durability by employing a narrow reinforcing cover for covering both edge portions of the belt layer and a wide reinforcing cover for covering the full width of the belt layer.

Another object of the present invention is to provide a radial tire for high speed travelling having more improved high speed durability while enjoying excellent riding comfort through a decrease in the rigidity difference between the splice portion and the other portions and a decrease in the number of splice portions by employing both a narrow reinforcing cover and a wide reinforcing cover.

In order to attain the above-mentioned object, the radial tire of the present invention is characterized in that each of the both edge portions on the outer periphery side of the belt layer is covered with a narrow reinforcing cover and, at the same time, the full width of the belt layer is covered with a wide reinforcing cover and that the wide reinforcing cover comprises a plurality of layers formed by winding a sheet in the circumferential direction of the tire by a plurality of turns so as to cause the resulting layers to be put on top of another.

Such a structure of the wide reinforcing cover not only reduces the number of the splice portions to one but also can enhance the rigidity of the whole reinforcing cover. Further, the thickness per sheet constituting the reinforcing cover can be decreased, thus leading to a reduction in the difference in level of the splice portion, which contributes to a reduction in the rigidity difference between the splice portion and the other portions.

DETAILED DESCRIPTION OF THE INVENTION

Figure 1:
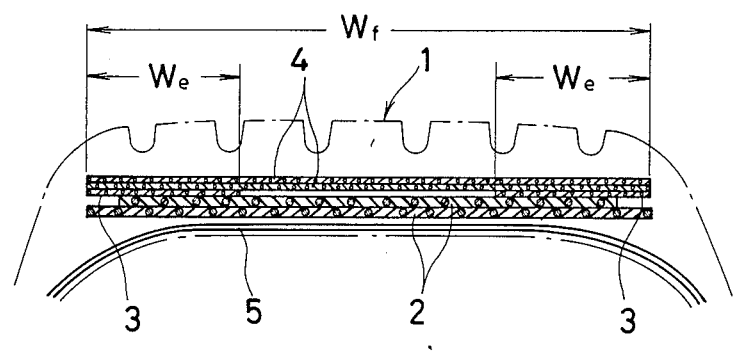
FIG. 1 is a schematic cross-sectional view of the tread portion of one form of a radial tire according to the present invention.

In the present invention, the belt layer for reinforcement provided on the tread portion comprises at least two layers. These at least two layers are provided in directions opposite to each other against the circumferential direction of the tire.

Although the belt layer may be made of any of a steel cord and a textile cord, it is preferred that a steel cord having a high modulus of elasticity be used. When a textile cord is used, a polyaramide cord is preferable. Further, in the present invention, the belt layer may be formed by the use of a combination of a belt made of a steel cord with a belt made of a polyaramide cord.

Since the reinforcing cover is provided in the present invention in order to suppress the lift of the belt layer caused by the action of centrifugal force, the thickness of the reinforcing cover need not be as large as that of the belt layer. In general, it is preferred that the reinforcing cover be as thin as possible, as far as it can exhibit an effect of suppressing the lift of the belt layer. The texture of the reinforcing cover is preferably that of cord fabric.

The fiber materials constituting the reinforcing cover are preferably heat shrinkable synthetic fibers such as nylon or polyester. A particularly preferable material is nylon. The reinforcing cover made of such a heat shrinkable synthetic fiber cord shrinks during vulcanization. The resulting shrinkage force binds the belt layer more efficiently, thus enabling the high speed durability to be further improved.

In the present invention, it is necessary to provide two kinds of reinforcing covers, i.e., a narrow cover for covering edge portions of the belt layer and a wide reinforcing cover for covering the whole of the belt layer. The width of the narrow reinforcing cover is not particularly limited. However, it is preferred that the width be 20% or more and 50% or less of the full width of the belt layer. This narrow reinforcing layer may have a structure of at least one layer. Therefore, the narrow reinforcing layer may comprise a plurality of layers. However, a preferable narrow reinforcing layer has a one layer structure.

It is necessary that the wide reinforcing cover for covering the full width of the belt layer be formed of only one sheet. The sheet should be wound up by at least two turns in the circumferential direction of a tire so as to cause the resulting layers to be put on top of another, thereby forming a plurality of layers. The winding of one sheet by a plurality of turns so as to cause the resulting layers to be put on top of another can reduce the number of splice portions to one. Specifically, when a plurality of separate sheets are wound up so as to cause the resulting layers to be put on top of another, a number of splice portions are formed because a splice portion is formed in each sheet. On the other hand, according to the present invention, the number of the splice portions can be reduced to one. The rigidity of the splice portion is higher than that of the other portions. Therefore, the smaller the number of splice portions, the smaller the number of portions having a rigidity difference. Further, in the present invention, the portions other than the splice portion of the wide reinforcing layer are overlapped to form a plurality of layers, thus causing an increase in the rigidity of the overlapped portions. This leads to a further reduction in the rigidity difference between the splice portion and the other portions.

In the present invention, it is preferred that the splice portion formed by the narrow reinforcing cover and the splice portion formed by the wide reinforcing cover are provided in a point symmetrical relationship against the center of the tire. Such a point symmetrical provision realizes a further improvement in the uniformity of the tire.

Figure 2:
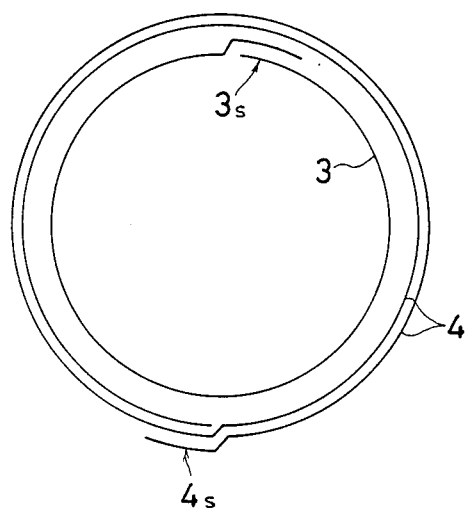
FIG. 2 is an illustrative view of the state of winding of a narrow reinforcing cover and a wide reinforcing cover which are provided on a radial tire according to the present invention.

The embodiments of the present invention as shown in FIGS. 1 and 2 will now be described.

FIGS. 1 and 2 show the tread portion of a radial tire. A carcass layer 5 is provided in the internal portion of the tread portion 1. The carcass layer 5 is provided at the outer periphery along the circumferential direction of the tire with a belt layer 2, 2 comprised of two steel cord layers, i.e., lower and upper steel layers. Each of the both edge portions located at the outer periphery portions of the belt layer 2 is covered with a narrow reinforcing cover 3 comprised of a nylon cord layer. As mentioned above, the reinforcing cover 3 is provided so that the width, We, is 20% or more and 50% or less of the full width of the belt layer 2. Further, a wide reinforcing cover 4 is provided on the narrow reinforcing cover 3 so as to cover the full width of the belt layer 2.

The reinforcing cover 4 has a width, Wf, substantially equal to that of the belt layer 2 and is formed by winding a sheet by two turns so as to cause the resulting layers to be put on top of another, thereby forming a double layer structure.

As shown in FIG. 2, the narrow reinforcing cover 3 forms one splice portion 3s in the circumferential direction of the tire. Although the wide reinforcing cover 2 has a double layer structure, it has only one splice portion 4s because it is formed by winding a sheet by two turns so as to cause the resulting layers to be put on top of the other. The above-mentioned two splice layers 3s and 4s are provided in a point symmetrical relationship against the center of the tire and distributed at intervals of 180°.

In the above-mentioned radial tire, a general expedient for enhancing the rigidity of the reinforcing cover, i.e., binding force with respect to the belt layer, is to increase the denier number of the cord constituting the reinforcing cover. However, the larger the denier number of the cord, the thicker the reinforcing cover. This enlarges the difference in level at the splice portion, which leads to an increase in the rigidity difference between the splice portion and the other portions.

On the other hand, according to the radial tire of the present invention as shown in FIGS. 1 and 2, a wide reinforcing cover is wound by a plurality of turns so as to cause the resulting layers to be put on top of another, which enables the rigidity to be enhanced without use of any cord having a high denier number. Further, since the thickness of the reinforcing cover per sheet may be small, the splice portion is free from an increase in the rigidity. Therefore, the rigidity difference between the splice portion and the other portions having an increased rigidity due to the winding of the sheet can be further decreased. This improves the uniformity of the tire, which in turn contributes to not only an improvement in riding comfort but also an improvement in high speed durability of the whole of the tire.

The tendency of a high speed automobiles in recent years is toward a wheel alignment design in which a camber angle is provided in the suspension of an automobile in order to improve a high speed performance, particularly a high speed driving stability. The alignment design brings about an increase in ground-contact pressure of the shoulder portions, which leads to an increase in heat build-up. Therefore, this is a factor causative of lowering in high speed durability. However, in the radial tire of the present invention, the lowering in high speed durability can be successfully suppressed even in the case of the above-mentioned alignment design by virtue of the expedients, i.e., provision of reinforcing covers for covering both edge portions of the belt portion at the shoulder portions of the tire, provision of a reinforcing cover having a multi-layer structure for covering the full width of the belt layer and a reduction in the rigidity difference between the splice portion and the other portions.

The effects of the above-mentioned radial tire according to the present invention will now be described in more detail with reference to experimental data obtained in the following examples.

EXAMPLE 1

Figure 3:
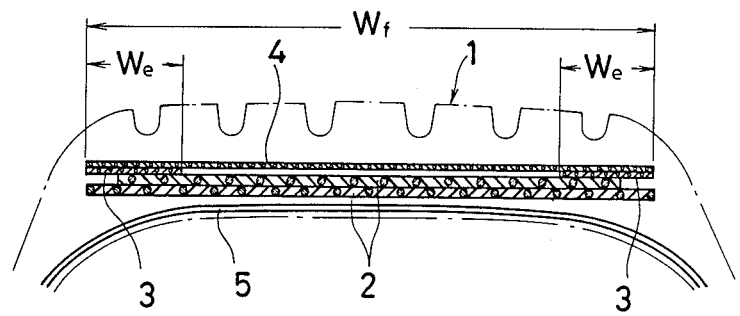
FIG. 3 is a schematic cross-section view of the tire portion of a conventional radial tire.
Figure 4:
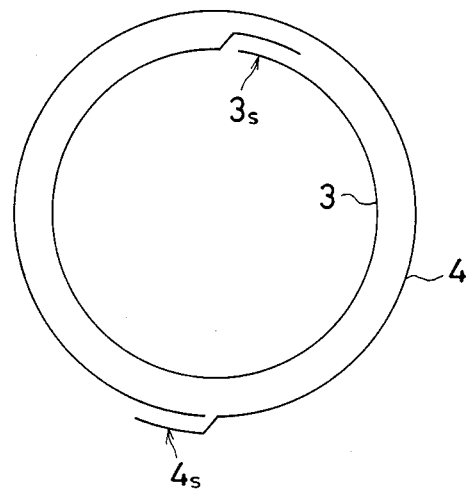
FIG. 4 is an illustrative view of the state of winding of a narrow reinforcing cover and a wide reinforcing cover which are provided on a conventional radial tire.

A radial tire of the present invention having a tread portion as shown in FIGS. 1 and 2 and a conventional radial tire having a tread portion as shown in FIGS. 3 and 4 were manufactured. The radial tires thus manufactured were compared with each other on the rigidity difference between the splice portion located at the central portion of the tire and the other portions and the rigidity difference between the splice portion located at the shoulder portions of the tire and the other portions. The results are shown in Table 1.

With respect to both the above-manufactured radial tires, the tire size was 225/50VR16, the belt layer was made of steel cord, and the reinforcing cover was made of a nylon cord. Further, the width, We, of the narrow reinforcing cover was 26% of the width of the belt layer, while the width, Wf, of the wide reinforcing cover was equal to that of the belt layer.

TABLE 1

| tire | central portion | shoulder portion |
|---|---|---|
| tire of the present invention | 1.5 | 1.3 |
| conventional tire | 2.0 | 1.5 |

As can be seen from Table 1, the tire of the present invention exhibited a rigidity difference between the splice portion located at the central portion of the tire and the other portions and a rigidity difference between the splice portion located at the shoulder portions of the tire and the other portions both smaller than those with respect to the conventional tire.

EXAMPLE 2

Two types of radial tires of the present invention having a tread portion as shown in FIGS. 1 and 2 (tires A and B) and a conventional radial tire having a radial portion as shown in FIGS. 3 and 4 were manufactured. With respect to each tire, uniformity was determined according to the method as stipulated in SAE J 332a. The uniformity was expressed in terms of indexes taking the values obtained with respect to the conventional tire as 100.

With respect to all the radial tires manufactured above, the tire size was 225/50VR16, the belt layer was made of a steel cord, and the reinforcing cover was made of a nylon cord. The width, Wf, of the wide reinforcing cover was equal to the width of the belt layer. However, the widths, We, of the narrow reinforcing cover with respect to the tire A of the present invention, tire B of the present invention and conventional tire were respectively 26%, 15%, and 15% of the width of the belt layer.

TABLE 2

| tire | uniformity |
|---|---|
| tire A of the present invention | 87 |
| tire B of the present invention | 95 |
| conventional tire | 100 |

As can be seen from Table 2, both the tires A and B of the present invention exhibited improved uniformity over the conventional tire. Particularly, the tire A in which the width of the narrow reinforcing core for covering the edge portions is more than 20% exhibited a remarkable improvement in uniformity.

EXAMPLE 3

The same radial tires of the present invention and conventional tire as those manufactured in Example 1 were applied to a test of determination of the maximum speed required for damaging the tire according to the indoor high speed durability test (ECE30) as stipulated in the prescriptions of European Community with respect to the case where the tire was mounted on an automobile so that the camber angle was 1.5° (tire D of the present invention and conventional tire F) and the case where no camber angle was provided (tire C of the present invention and conventional tire E). The results are shown in Table 3.

TABLE 3

| tire | high speed durability (max. speed) |
|---|---|
| tire C of the present invention | 320 km/h |
| conventional tire E | 290 km/h |
| tire D of the present invention | 310 km/h |
| conventional tire F | 270 km/h |

As can be seen from Table 3, both the tires C and D of the present invention exhibited high speed durability superior to that of the conventional tires E and F. Further, with respect to the difference in high speed durability between the case where a camber angle was provided and the case where no camber angle was provided, the difference with the conventional tires was 20 km/h, while the difference with the tires of the present invention was as small as 10 km/h.

As described above, the present invention improved the conventional tire having such a structure that the belt layer is covered at each of the both edge portions with at least one narrow reinforcing cover and is further covered over the full width thereof with a wide reinforcing cover, in such a manner that the wide reinforcing cover is formed by winding a sheet by a plurality of turns so as to cause the resulting layers to be put on top of another. This realizes not only an increase in rigidity without increasing the thickness of the reinforcing cover per sheet but also an improvement in binding force with respect to the belt layer. Further, this reduces the rigidity difference between the splice portion and the other portions, which leads to a remarkable improvement in high speed durability without causing any lowering in riding comfort.

We claim:

1. A new radial tire comprising a belt structure composed of at least two layers of steel cords provided in a tread portion and having a pair of edge portions, a pair of narrow reinforcing covers with each said narrower cover provided radially outward of the outer periphery of said belt structure so that each of said edge portion of said belt structure is covered with one of said narrower reinforcing covers and a wide reinforcing cover provided on said narrow reinforcing covers so as to cover the full width said belt structure, said narrow reinforcing covers and said wide reinforcing cover each comprised of a heat shrinkable nylon cord with said wide reinforcing cover having a radial thickness less than the radial thickness of said belt structure and the width of each of said narrow reinforcing covers is between 20% and 50% of the full width of said belt structure, wherein said wide reinforcing cover has a multi-layer structure formed by winding a single, continuous sheet in the circumferential direction of the tire so as to provide two complete windings with one layer on top of a preceding layer.

* * * * *